Feb. 23, 1932.  G. D. JONES  1,846,340
DRIVING MECHANISM
Filed March 25, 1929  2 Sheets-Sheet 1
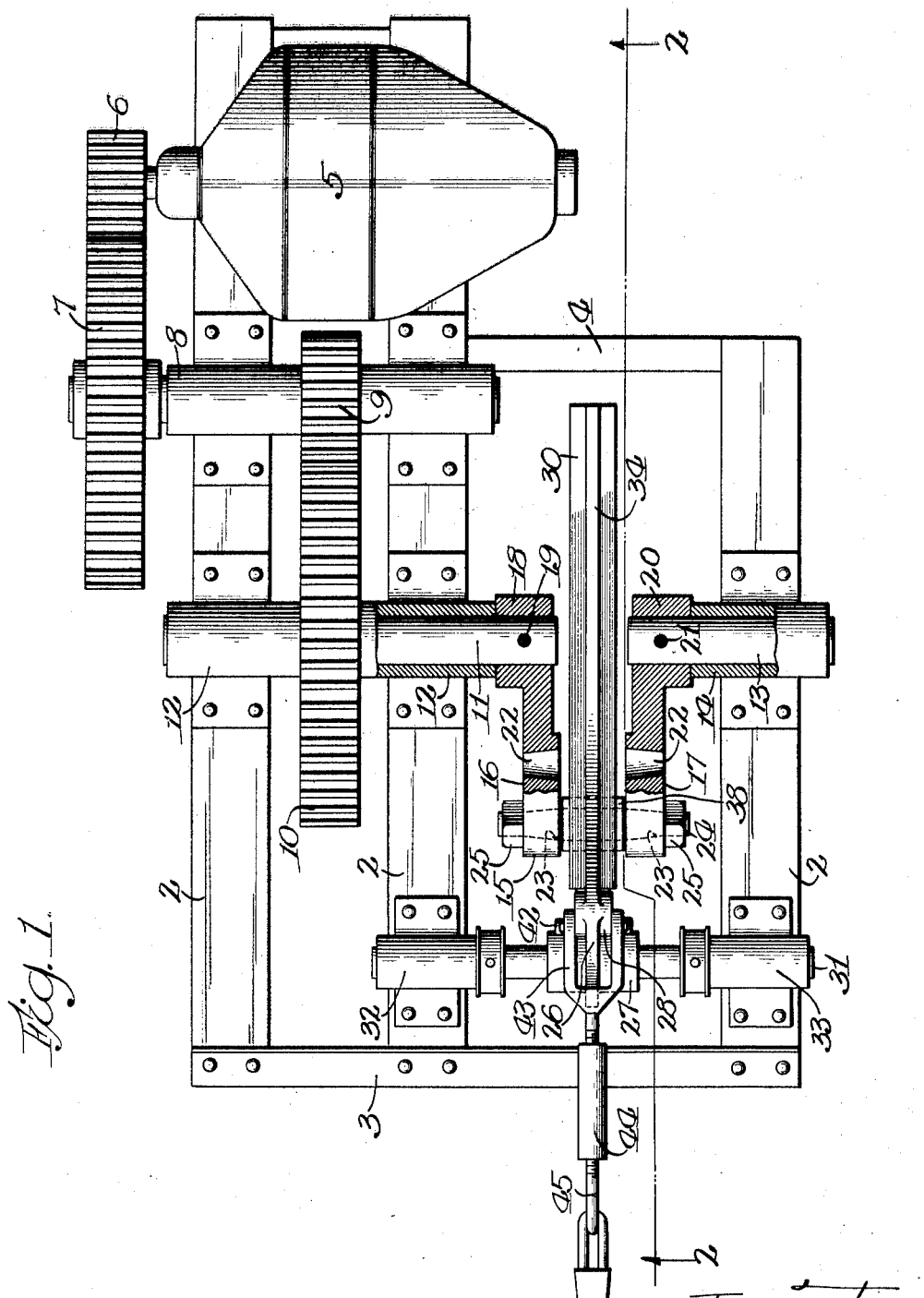
Fig. 1.

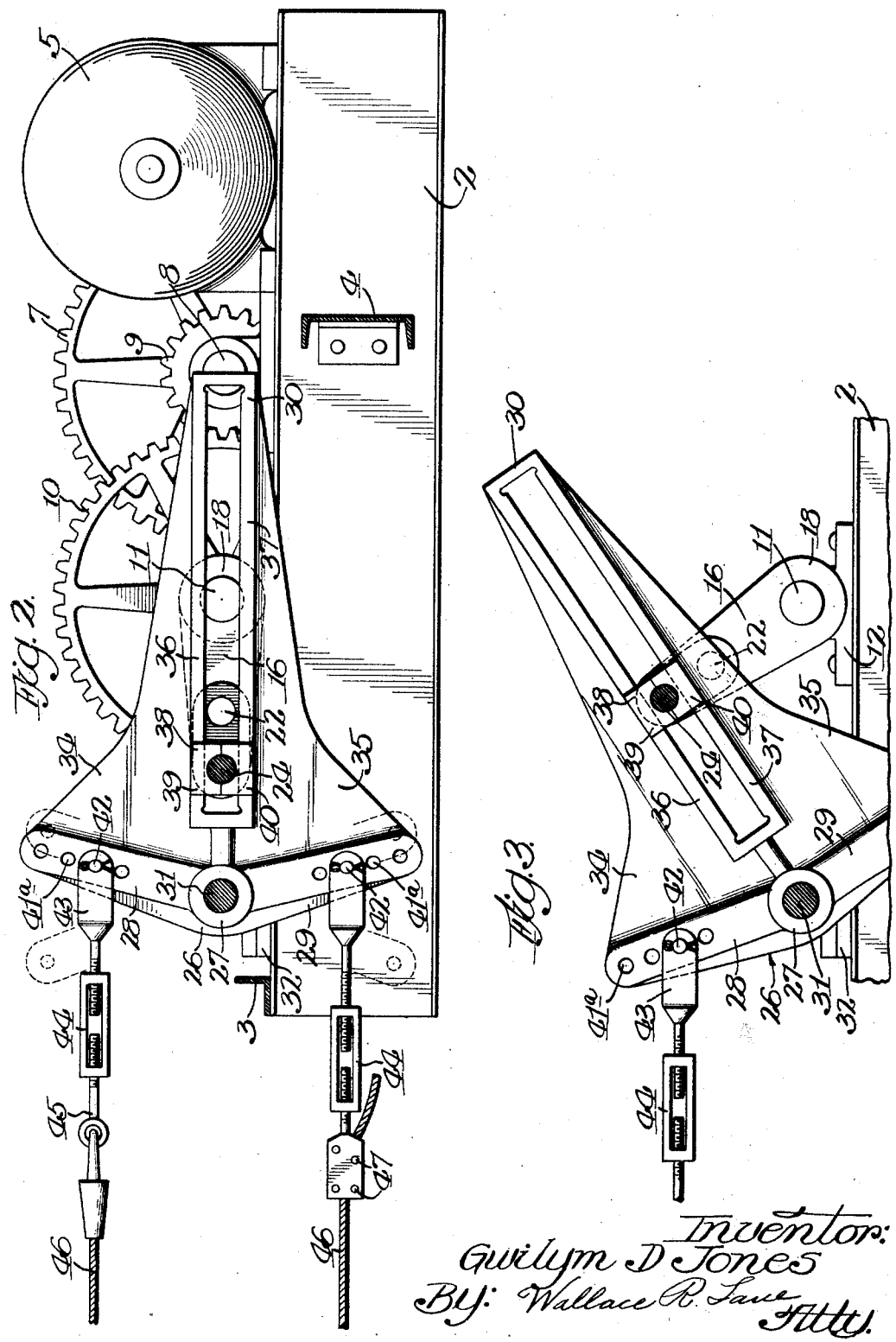

Patented Feb. 23, 1932

1,846,340

UNITED STATES PATENT OFFICE

GWILYM DAVID JONES, OF OAK CREEK, COLORADO, ASSIGNOR OF ONE-HALF TO BENJAMIN W. SNODGRASS, OF DENVER, COLORADO

DRIVING MECHANISM

Application filed March 25, 1929. Serial No. 349,582.

The present invention relates to driving means, which, while of general application, is particularly adapted for oscillating mining conveyors.

Among the objects of the invention is to provide a novel driving or operating mechanism for a mining conveyor, and particularly for converting uniform rotary motion into a varying translated or lineal motion for oscillating the pans or flights of a conveyor.

It is an object of my invention to provide a novel mechanism which will impart a rapid or violent jerking motion in one direction to a cable connected to a series of pans or flights, to cause the material thereon to move progressively in a forward direction, and to impart to the cable, and likewise to the pans or flights, a comparatively slow, jerking reverse movement to return the pans or flights to the starting position. The material on the conveyor is progressively moved in a forward direction with each successive violent jerking movement, and by reason of the momentum of the material, the pans or flights may move rearwardly on the reverse stroke to their starting points at the instant when the material has dissipated its momentum.

An object of the invention is to provide a novel device that is compact, simple, strong and easily assembled, and which will produce these alternating forward and reverse jerking movements of varying intensity for progressively moving the material on the pans or flights of such a conveyor. In the specific embodiment selected to illustrate the invention, a rocking crank having a slotted arm is driven by way of a rotating crank having a crank pin slidably operative in the slot of the slotted arm. Over a portion of travel of the rotating crank a rapid and violent rocking movement is produced in the rocking crank, and over the remainder of the travel of the rotating crank, a less violent and slower rocking movement is produced in the rocking member. These varying movements are imparted to a cable connected to the rocking member and to the individual pans or flights of the conveyor.

The invention also comprehends a novel means for varying the length of the oscillating stroke. In the embodiment selected to illustrate the invention, the rockable member is provided with a plurality of radially spaced holes. By attaching the power transmitting element or cable to a hole nearer the pivot point, the length of stroke is less than if the power transmitting element or cable were connected at a further distance from the pivot point.

Another feature of the invention is to provide a rotating crank having an adjustable pintle or pin which may be positioned at varying distances from the center of the driving shaft for varying the angular rocking of the rocking member and likewise the length of the oscillating stroke, as also for varying the time interval between two successive violent jerking movements simultaneously with the varying of the length of the oscillating stroke.

By adjusting the position of the pintle and likewise the position of the cable, a very close control of the length of movement of the cable and likewise the pans or flights from the conveyor, and of the time interval between two successive similar strokes, may be had.

Other objects, features, capabilities and advantages are comprehended by the invention as will later appear and as are inherently possessed thereby.

Referring to the drawings:

Fig. 1 is a plan view of a mechanism constructed in accordance with the invention, with parts broken away to show the construction of a crank means for driving a rockable member.

Fig. 2 is a cross sectional view taken in a plane represented by the line 2—2 of Fig. 1, and showing in side elevation the construction of a rockable member slidably engaging a pintle of a crank and which, when rocked, produces an oscillating movement in a cable.

Fig. 3 is a detached side view in elevation of a rockable member and showing the same in a position at the beginning of a reverse stroke.

Referring now more in detail to the drawings, the embodiment selected to disclose the invention, comprises a frame 1 constructed of longitudinal I-beams 2 adapted to rest upon a foundation or flooring for supporting my novel mechanism, the beams 2 being connected together and held in substantially rigid position by an angle iron 3 and a channel iron 4. A motor or source of power 5 is mounted on and secured to an extended portion of the frame 1. A pinion gear 6, mounted on the rotor shaft of the motor 5, meshes with a gear 7 mounted on a shaft 8 on the frame 1, shaft 8 carrying a gear 9 meshing with a gear 10, secured to a shaft 11 suitably journalled in bearings 12 mounted on and fastened to the longitudinal I-beams 2.

A stub shaft 13 is journalled in a bearing 14 mounted on one of the longitudinal I-beams 2, and is in alinement with the center of the shaft 11 and spaced therefrom.

A crank 15 is provided with arm portions 16 and 17 each having a hub portion 18 and 20 respectively secured to shafts 11 and 14 by pins 19 and 21 passing through the hubs and shafts. The arms 16 and 17 are of like construction and are provided with radially spaced holes 22 and 23 adapted to selectively receive a bolt or pintle 24 held in place by the nuts 25 at the ends thereof. This bolt or pintle 24, causes the two crank arms to rotate together or in unison, the arm 16 being driven by the shaft 11, which in turn drives the arm 17 connected to the stub shaft 13, and which at the same time drives a rockable member (to be later described.)

A member 26 having a central hub 27, arm portions 28 and 29, extending radially from the hub 27, and a longitudinal guide arm 30, is provided and is mounted upon a shaft 31 parallel to the shaft 11, the latter being mounted in bearings 32 and 33, mounted on and connected to the I-beams 2. The arm portions 28 and 29 and the guide arm 30 are reinforced by integral webs 34 and 35 between the arms and extending longitudinally of the guide arm. The guide arm 30 is slotted to provide guide surfaces 36 and 37 in the member 26. A split guide block 38 is adapted to slide along the guide surfaces and are provided with flanges 39 and 40, extending respectively on both sides of the slotted portion 30. This split guide block 38 is provided with a bearing portion 41 adapted to be mounted on the pin or pintle 24 of the crank 15.

Each one of the arms 28 and 29 of the member 26 are provided with a series of radially spaced bolt holes 41ª in any one of which is received a pin 42 passing through a bifurcated end of a clevis 43. The clevis has an extended threaded stem screwed to an end of a turn-buckle 44. An eye bolt 45 connected to one side or section of a cable 46 has an extended threaded stem engaging the other end of the turn buckle 44. The other side or section of the cable 46 is connected to a cable clamp 47 having an extended threaded stem which engages the turn buckle 44. The loop end of the cable 46 passes over a pulley or the like (not shown) in the mine, such that the two sides or sections of the cable are parallel and extend along the main passage, one of the sections being connected to the pans or flights of an oscillating conveyor.

As the crank 15 is rotated or driven by the motor 5 through the gearing, the member 26 will rock about axis of the shaft 31, thus causing a pull in one section of the cable, and a let-up in the other, and vice versa, so that there is a to-and-fro movement of the cable along the length thereof. A like to-and-fro movement is likewise imparted to the pans or flights of the conveyor. It will be seen that the rotary motion of the crank is converted to a lineal or translated movement in the cable. The length of these movements in the cable may be varied by connecting the same to any selected hole or opening in the arms 28 and 29. A further control of the length of these oscillating strokes and the time interval between two successive strokes of like character, may be varied by placing the removable pintle 24 in any selected pair of holes such as 22 or 23 on the arms 16 and 17 of the crank 15.

While I have herein described and upon the drawings shown an illustrative embodiment of the invention, it is to be understood that the invention is not limited thereto, but comprehends other constructions, details, arrangements of parts and features without departing from the spirit thereof.

Having thus disclosed the invention, I claim:

A device for operating an oscillating mining conveyor, comprising a power transmitting element for said conveyor, a frame, a crank on said frame and having a pintle, a source of power for rotating said crank, a rockable member mounted on the frame, said member being provided with laterally extending arm portions and a longitudinal extending arm portion having a slot therein and adapted to slidably receive said pintle, means for connecting said power transmitting element at varying distances from the rocking center of said member, said member adapted to be rocked to oscillate said power transmitting element at varying speeds as the crank is driven at a uniform speed.

In witness whereof, I hereunto subscribe my name to this specification.

GWILYM DAVID JONES.